United States Patent [19]

Scott et al.

[11] 4,125,571

[45] Nov. 14, 1978

[54] THERMOPLASTIC MOLDING COMPOSITION

[75] Inventors: Steven W. Scott; Allen D. Wambach, both of Evansville, Ind.

[73] Assignee: General Electric Company, Pittsfield, Mass.

[21] Appl. No.: 750,556

[22] Filed: Dec. 14, 1976

[51] Int. Cl.$^2$ ............................................. C08L 67/02
[52] U.S. Cl. ................................. 260/860; 260/40 R; 528/302; 528/305; 528/307
[58] Field of Search ................... 260/860, 75 R, 40 R

[56] References Cited

U.S. PATENT DOCUMENTS

| | | | |
|---|---|---|---|
| 2,901,466 | 8/1959 | Kibler et al. | 260/75 M |
| 3,131,148 | 4/1964 | Taulli | 260/40 R |
| 3,931,094 | 1/1976 | Segal et al. | 260/37 N |
| 3,953,394 | 4/1976 | Fox et al. | 260/40 R |

Primary Examiner—Lorenzo B. Hayes
Assistant Examiner—Amelia B. Yarbrough
Attorney, Agent, or Firm—Myron B. Kapustij; William F. Mufatti

[57] ABSTRACT

A thermoplastic composition of a combination of polyesters comprising a poly(1,4-butylene terephthalate) and a polyester derived from a cyclohexanedimethanol.

14 Claims, No Drawings

THERMOPLASTIC MOLDING COMPOSITION

This invention is concerned with thermoplastic polyester compositions. More particularly, it relates to a blend of polyesters comprising a poly(1,4-butylene terephthalate) and a polyester resin derived from a cyclohexanedimethanol. This composition can additionally contain a reinforcing amount of a reinforcing filler.

BACKGROUND OF THE INVENTION

Poly(1,4-butylene terephthalate) resins are well known and have been widely employed for the production of thermoplastic molded articles. Also, reinforced compositions of poly(1,4-butylene terephthalate) have been commercially available for a number of years. Unfilled poly(1,4-butylene terephthalate) has good processability, strength and toughness. Other key properties include low water absorption resulting in good dimensional stability, low static and dynamic coefficients of friction, good chemical and abrasion resistance, and good electrical properties. However, the unfilled poly(1,4-butylene terephthalate) has relatively low heat deflection temperature which limits its use. Also, unfilled poly(1,4-butylene terephthalate) has a tendency to shrink to a great extent after being molded.

Reinforced poly(1,4-butylene terephthalate) and, particularly, glass reinforced poly(1,4-butylene terephthalate) has additionally increased tensile strength over the unfilled poly(1,4-butylene terephthalate). However, when molded, particularly glass reinforced poly(1,4-butylene terephthalate) has a tendency to become distorted or warped, especially when the molded article has a thin section.

DESCRIPTION OF THE INVENTION

It has been found that if a polyester resin derived from a cyclohexanedimethanol is added to a poly(1,4-butylene terephthalate) resin, the shrinkage is reduced while increasing the deflection temperature under load. Additionally, if the polyester resin derived from a cyclohexanedimethanol is added to a reinforced poly(1,4-butylene terephthalate) molding composition, the molded articles are substantially resistant to warpage or distortion after they are removed from the mold. This result is achieved without any appreciable decrease in the mechanical, physical or molding properties of a typical glass reinforced poly(1,4-butylene terephthalate) molding composition.

According to this invention, there are provided thermoplastic compositions comprising:
a. a poly(1,4-butylene terephthalate) resin or a copolyester thereof with a minor amount of an aliphatic or aromatic dicarboxylic acid or an aliphatic polyol;
b. a polyester resin derived from a cyclohexanedimethanol.

A preferred feature of this invention is to provide reinforced thermoplastic compositions comprising:
a. a poly(1,4-butylene terephthalate) resin or a copolyester thereof with a minor amount of an aliphatic or aromatic dicarboxylic acid or an aliphatic polyol;
b. a polyester resin derived from a cyclohexanedimethanol;
c. a reinforcing amount of a reinforcing filler.

The high molecular weight, polymeric 1,4-butylene glycol terephthalates have repeating units of the general formula:

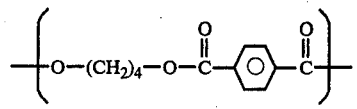

Also contemplated are mixtures of such esters with minor amount, e.g., from 0.5 to 2% by weight, of units derived from aliphatic or aromatic dicarboxylic acids and/or aliphatic polyols, e.g., glycols, i.e., copolyesters. These can also be made following the teachings outlined in Whinfield et al, U.S. Pat. No. 2,465,316 and Pengilly, U.S. Pat. No. 3,047,539, for example. Poly(1,4-butylene terephthalate) is commercially available.

Especially preferred polyesters for use as component (a) are poly(1,4-butylene terephthalate) resins. Special mention is made of this polyester because it crystallizes at an especially rapid rate.

Among the units which can be present in the copolyesters are those derived from aliphatic dicarboxylic acids, e.g., of up to about 50 carbon atoms, including straight and branched chain acids, such as adipic acid, dimerized $C_{16}-C_{18}$ unsaturated acids (which have 32 to 36 carbon atoms), trimerized such acids, and the like. Among the units in the copolyesters can also be minor amounts derived from aromatic dicarboxylic acids, e.g., of up to about 36 carbon atoms, such as isophthalic acids and the like. In addition to the 1,4-butylele glycol units, there can also be minor amounts of units derived from other aliphatic glycols and polyols, e.g., of up to about 50 carbon atoms, including ethylene glycol, propylene glycol, glycerol and the like. Such copolyesters can be made by techniques well known to those skilled in the art.

These polymeric 1,4-butylene glycol terephthalates have an intrinsic viscosity of at least 0.4 and preferably about 0.7 deciliters/gram as measured in o-chlorophenol, a 60/40 phenol tetrachloroethane mixture or a similar solvent at 25°-30° C. The upper limit is not critical, but it will generally be about 2.5 dl./g. Especially preferred polyesters will have an intrinsic viscosity in the range of 0.7 to 1.3.

The polyesters derived from cyclohexanedimethanol are prepared by condensing either the cis- or trans- isomer (or a mixture thereof) of, for example, 1,4-cyclohexanedimethanol with a hexacarbocyclic dicarboxylic acid so as to produce a polyester having recurring units having the following formula:

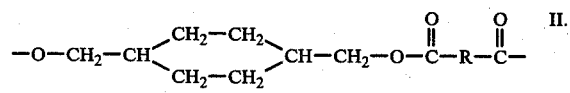

wherein the substituted cyclohexane ring is selected from the group consisting of the cis- and trans- isomers thereof and R represents an organic radical containing from 6 to 20 carbon atoms which is the decarboxylated residue derived from a hexacarbocyclic dicarboxylic acid.

The preferred polyester resins may be derived from the reaction of either the cis- or trans- isomer (or a mixture thereof) of 1,4-cyclohexanedimethanol with a mixture of iso- and terephthalic acids. These polyesters have recurring units of the formula:

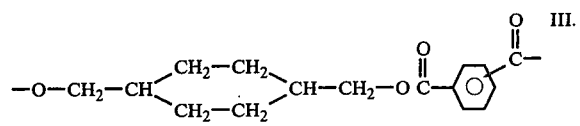

These polyesters can be produced by well known methods in the art such as those set forth in U.S. Pat. No. 2,901,466 which is incorporated herein by reference. The poly(1,4-cyclohexanedimethanol terephthalate-co-isophthalate) is commercially available.

Of course, it is understood that the polyester resins of this invention can be prepared by condensing 1,4-cyclohexanedimethanol and minor amounts of other bifunctional glycols with the hexacarbocyclic dicarboxylic acid. These other bifunctional glycols include the polymethylene glycols containing from 2 to 10 or more carbon atoms such as ethylene glycol, butylene glycol, etc.

Examples of hexacarbocyclic dicarboxylic acids wherein the carboxy radicals are attached in para relationship to a hexacarbocyclic residue indicated by R in formula II include terephthalic acid, trans-hexyhydroterephthalic acid, p,p'-sulfonyldibenzoic acid, 4,4'-diphenic acid, 4,4'-benzophenonedicarboxylic acid, 1,2-di(p-carboxyphenyl) ethane, 1,2-di(p-carboxyphenoxy) ethane, 4,4'-dicarboxydiphenyl ether, etc. and mixtures of these. All of these acids contain at least one hexacarbocyclic nucleus. Fused rings can also be present such as in 1,4- or 1,5-naphthalenedicarboxylic acid. The hexacarbocyclic dicarboxylic acids are preferably those containing a trans-cyclohexane nucleus or an aromatic nucleus containing from one to two benzene rings of which at least one has the usual benzenoid unsaturation. Of course, either fused or attached rings can be present. All of the compounds named in this paragraph come within the scope of this preferred group. The preferred dicarboxylic acid is terephthalic acid, or mixtures or terephthalic and isophthalic acids.

These polyesters should have an intrinsic viscosity between 0.40 and 2.0 dl./g. measured in a 60/40 phenol-tetrachloroethane solution or a similar solvent at 25°–30° C. Especially preferred polyesters will have an intrinsic viscosity in the range of 0.6 and 1.2 dl./g.

The poly(1,4-butylene terephthalate) resin and the polyester resin derived from cyclohexanedimethanol are combinable with each other in all proportions, such as 1 to 99 parts by weight of poly(1,4-butylene terephthalate) and 99 to 1 parts by weight of a polyester derived from cyclohexanedi(lower alkanol). In general, however, compositions containing from about 95 to about 20 parts by weight of poly(1,4-butylene terephthalate) and from about 5 to 80 parts by weight of a polyester derived from cyclohexanedimethanol are preferred.

The reinforcing agents may be selected from finely divided aluminum, iron or nickel and the like, metal oxides and non-metals, such as carbon filaments, silicates, such as mica, aluminum silicate (clay), talc, asbestos, titanium dioxide, Wollastonite, Novaculite, potassium titanate and titanate whiskers, glass flakes, glass beads and fibers and polymeric fibers and combinations thereof.

Although it is only necessary to use a reinforcing amount of the reinforcing agent, from 1–60 parts by weight of the total weight of the composition may comprise the reinforcing agent. A preferred range is from 5–50 parts by weight.

The preferred reinforcing agents are of glass, and it is preferred to use fibrous glass filaments, mixtures of glass and talc, glass and mica, glass and aluminum silicate, for example. The preferred filaments for plastics reinforcement are made by mechanical pulling. The glass filament diameters range from about 0.00012 to about 0.00075 inch, but this is not critical to the present invention.

The instant composition may be prepared by conventional techniques. One convenient method comprises blending the polyesters in powder or granular form, extruding the blend and comminuting into pellets or other suitable shapes.

The reinforcements are added in any usual manner, i.e., by dry blending or mixing or by mixing in the melted state in an extruder, or a heated mill or in other mixers.

Obviously, other materials can also be employed with the composition of this invention and include such materials as anti-static agents, pigments, mold release agents, thermal stabilizers, flame retardants, impact modifiers, extenders, UV stabilizers and the like.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE I

The following ingredients are dried:

poly(1,4-butylene terephthalate), intrinsic viscosity, 1.03 dl./g. measured in a 60/40 phenol tetrachloroethane solution at 25° C. (VALOX 310, General Electric Co.)

poly(1,4-cyclohexanedimethanol terephthalate-co-isophthalate), intrinsic viscosity 0.74 dl./g. measured in a 60/40 phenol tetrachloroethane solution at 30° C. (KODAR A150, Eastman Chemical Products.)

The blends are compounded in an extruder at 540° F. The extrudate is pelletized and the pellets are injection molded at 480° F. into ASTM type test bars in a standard machine. The test bars are tested for the following physical properties: Deflection temperature under load, ASTM D-648; Impact strength, ASTM D-256; Flexural strength, ASTM D-790; and shrinkage, which is measured on ⅛" × 4" diameter disc. The shrinkage is measured in mils per inch. The formulations are set forth below, while the results are set forth in Table I.

|  | A | B | C | D | E | F | G |
|---|---|---|---|---|---|---|---|
| poly(1,4-butylene terephthalate) | 99.8 | 94.8 | 89.8 | 79.8 | 69.8 | 49.8 | 24.8 |
| poly(1,4-cyclohexane dimethanol terephthalate-co-isophthalate) | — | 5 | 10 | 20 | 30 | 50 | 75 |
| stabilizers* | 0.20 | 0.20 | 0.20 | 0.20 | 0.20 | 0.20 | 0.20 |

*Irganox 1093 and Ferro 904

TABLE I

|  | A | B | C | D | E | F | G |
|---|---|---|---|---|---|---|---|
| Deflection temperature, °F at 264 psi | 132 | 136 | 136 | 140 | 155 | 160 | 165 |
| Impact strength, Unnotched, ft.lbs./in. | 8.4 | NB' | NB' | NB' | NB' | NB' | NB' |

It can be seen from TABLE I that the composition of the instant invention has considerably less shrinkage, higher deflection temperature under load, increased impact strength and acceptable flexural strength as compared to poly(1,4-butylene terephthalate).

EXAMPLE II

The following ingredients are dried:
poly(1,4-butylene terephthalate), as in Example I;
poly(1,4-cyclohexane dimethanol terephthalate-co-isophthalate) as in Example I; and
fibrous glass reinforcement, 1/8 inch (Owens-Corning).

The compositions are extruded and molded by the procedure of Example I. The test bars are tested for the following physical properties: Deflection temperature under load, ASTM D-648; Impact strength, ASTM D-256; Flexural strength, ASTM D-790; Tensile strength, ASTM D-1708; and also the warpage of a disc 1/16" thick × 4" in diameter as molded is measured in millimeters. The specimens are measured after a heat treatment at 350° F. for 30 minutes. The formulations are set forth below, while the results are set forth in Table II.

|  | H | I | J | K | L | M | N | O | P | Q |
|---|---|---|---|---|---|---|---|---|---|---|
| Poly(1,4-butylene terephthalate) | 69.85 | 62.85 | 55.85 | 41.85 | 39.85 | 54.85 | 59.85 | 34.85 | 49.85 | 54.85 |
| Poly(1,4-cyclohexanedimethanol terephthalate-co-isophthalate) | — | 7 | 14 | 28 | 30 | 30 | 30 | 35 | 35 | 35 |
| Glass filler | 30 | 30 | 30 | 30 | 30 | 15 | 10 | 30 | 15 | 10 |
| Stabilizers* | 0.15 | 0.15 | 0.15 | 0.15 | 0.15 | 0.15 | 0.15 | 0.15 | 0.15 | 0.15 |

*(Ferro 904 and Mold Release)

TABLE II

|  | H | I | J | K | L | M | N | O | P | Q |
|---|---|---|---|---|---|---|---|---|---|---|
| Deflection temperature °F at 66 psi | 430 | 430 | 430 | 430 | 430 | 428 | 405 | 432 | 427 | 398 |
| °F at 264 psi | 395 | 398 | 402 | 395 | 401 | 229 | 259 | 399 | 292 | 228 |
| Impact strength ft.-lbs./in., notched | 1.7 | 1.8 | 1.8 | 2.0 | 1.7 | 1.1 | 0.7 | 1.7 | 1.1 | 0.7 |
| ft.-lbs./in., unnotched | 13 | 14 | 14 | 15 | 14 | 11 | 8 | 14 | 12 | 8.5 |
| Flexural strength, psi | 24,600 | 27,400 | 24,600 | 24,200 | 26,200 | 21,000 | 17,800 | 25,400 | 20,200 | 17,800 |
| Tensile strength, psi | 15,200 | 15,400 | 15,400 | 15,200 | 15,600 | 13,000 | 11,200 | 15,500 | 12,700 | 11,200 |
| Warpage, as molded, mm | 38 | 25 | 13 | 0 | 0 | 0 | 0 | 0 | 0 | 0 |
| 350° F/30 minutes, mm | 40 | 31 | 21 | 10 | 16 | 9 | 5 | 15 | 11 | 6 |

As can be seen from TABLE II, the composition of the instant invention produces a molded article resistant to warpage without appreciable decrease in the physical properties as compared to an article molded from a glass reinforced poly(1,4-butylene terephthalate) molding composition.

EXAMPLE III

The following ingredients are dried:
poly(1,4-butylene terephthalate), as in Example I;
poly(1,4-cyclohexane dimethanol terephthalate-co-isophthalate), as in Example I;
fibrous glass reinforcement, 1/8 inch, as in Example II;
talc (CP38-33, Pfizer Minerals, Pigments and Metals);
mica (Suzorite 200-H, Marietta Resources International, Ltd.).

The compositions are extruded and molded by the procedure of Example I. The test bars are tested for the physical properties as set forth in Example II. The formulations are set forth below, while the results are set forth in TABLE III.

|  | A' | B' | C' | D' |
|---|---|---|---|---|
| poly(1,4-butylene terephthalate) | 39.80 | 34.80 | 34.80 | 39.70 |
| poly(1,4-cyclohexane dimethanol-co-isophthalate) | 25 | 30 | 30 | 25 |
| glass fiber | 20 | 20 | 20 | 15 |
| Talc | — | — | 15 | 20 |
| Mica | 15 | 15 | — | — |
| Stabilizers* | 0.20 | 0.20 | 0.20 | 0.30 |

*Ferro 904, Irganox 1093 and Mold Release

TABLE III

|  | A' | B' | C' | D' |
|---|---|---|---|---|
| Deflection temperature, °F at 66 psi | 427 | 420 | 420 | 426 |
| °F at 264 psi | 378 | 340 | 361 | 364 |
| Impact Strength ft.lbs./in., notched | 1.1 | 1.3 | 1.0 | 0.8 |
| ft.lbs./in., unnotched | 8 | 7 | 9 | 8 |
| Flexural strength, psi | 20,600 | 20,200 | 19,400 | 18,600 |
| Tensile strength, psi | 12,400 | 12,800 | 12,100 | 11,400 |
| Warpage, as molded, mm | 0 | 0 | 0 | 0 |
| 350° F/30 minutes, mm | 9 | 7 | 7 | 5 |

As can be seen from TABLE III, the composition of the instant invention produces a molded article which is resistant to warpage as compared to an article molded from glass reinforced poly(1,4-butylene terephthalate) molding composition. (Table II, Sample H.)

Although the above examples have shown various modifications of the present invention, other variations are possible in the light of the above teachings. It is, therefore, to be understood that changes may be made in the particular embodiments of the invention described which are within the full intended scope of the invention as defined by the appended claims.

What is claimed is:

1. A thermoplastic molding composition which consists essentially of a combination of polyesters consisting of:
   a. a poly(1,4-butylene terephthalate) resin or a copolyester thereof with a minor amount of an aliphatic or aromatic dicarboxylic acid or an aliphatic polyol;

b. a polyester resin derived from a cyclohexanedimethanol and a hexacarbocyclic dicarboxylic acid.

2. A thermoplastic molding composition as defined in claim 1 where component (a) is a poly(1,4-butylene terephthalate) resin.

3. A thermoplastic molding composition as defined in claim 1 wherein the polyester resin has repeating units of the formula:

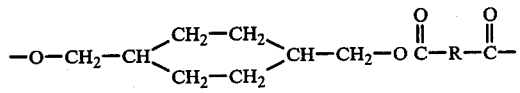

wherein the substituted cyclohexane ring is selected from the group consisting of the cis- and trans- isomers thereof and R represents an organic radical containing from 6 to 20 carbon atoms which is the decarboxylated residue derived from a hexacarbocyclic dicarboxylic acid.

4. A thermoplastic molding composition as defined in claim 3 wherein the polyester resin has the repeating unit:

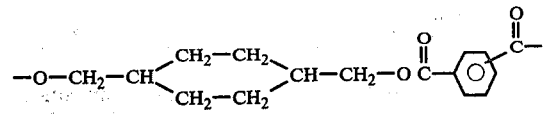

5. A thermoplastic molding composition as defined in claim 1 wherein component (a) comprises from about 95 to about 20 parts by weight and component (b) comprises from about 5 to about 80 parts by weight.

6. A reinforced thermoplastic molding composition which consists essentially of:
(i) a combination of polyesters consisting of
 (a) a poly(1,4-butylene terephthalate) resin or a copolyester thereof with a minor amount of an aliphatic or aromatic dicarbocyclic acid or an aliphatic polyol, and
 (b) a polyester resin derived from a cyclohexanedimethanol and a hexacarbocyclic dicarboxylic acid; and
(ii) a reinforcing amount of a reinforcing filler.

7. A reinforced thermoplastic molding composition as defined in claim 6 where component (a) is a poly(1,4-butylene terephthalate)resin.

8. A reinforced thermoplastic molding composition as defined in claim 6 wherein the polyester resin has repeating units of the formula:

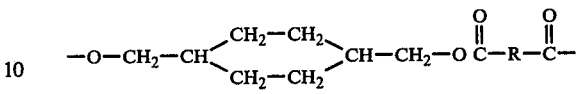

wherein the substituted cyclohexane ring is selected from the group consisting of the cis- and trans- isomers thereof and R represents an organic radical containing from 6 to 20 carbon atoms which is the decarboxylated residue derived from a hexacarbocyclic dicarboxylic acid.

9. A reinforced thermoplastic molding composition as defined in claim 8 wherein the polyester resin has the repeating unit:

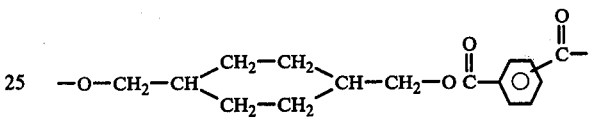

10. A reinforced thermoplastic molding composition as defined in claim 6 wherein the reinforcing filler is glass fiber.

11. A reinforced thermoplastic molding composition as defined in claim 6 wherein component (a) comprises from about 95 to about 20 parts by weight and component (b) comprises from about 5 to about 80 parts by weight.

12. A reinforced thermoplastic molding composition as defined in claim 6 wherein the reinforcing filler comprises from about 5 to about 50 parts by weight based on the combined weights of components (a) and (b).

13. A reinforced thermoplastic molding composition as defined in claim 6 wherein the reinforcing filler is glass and mica.

14. A reinforced thermoplastic molding composition as defined in claim 6 wherein the reinforcing filler is glass and talc.

* * * * *

UNITED STATES PATENT AND TRADEMARK OFFICE
CERTIFICATE OF CORRECTION

PATENT NO. : 4,125,571
DATED : November 14, 1978
INVENTOR(S) : Steven W. Scott and Allen D. Wambach It is certified that error appears in the above-identified patent and that said Letters Patent are hereby corrected as shown below:

Col. 2, line 32, "1,4-butylele" should be -- 1,4-butylene --

Col. 5, TABLE I, insert the following as part of the Table:

"Flexural strength, psi    13,500  13,100  13,100  13,100  12,300  11,900  11,100

Shrinkage, mils/in.         21      20      19      19      16      13      8

' - indicates no break "

Signed and Sealed this

Twentieth Day of February 1979

[SEAL]

Attest:

RUTH C. MASON
Attesting Officer

DONALD W. BANNER
Commissioner of Patents and Trademarks